Sept. 28, 1937.   W. E. NOBBE   2,094,183
SAFETY GLASS
Filed Dec. 5, 1933
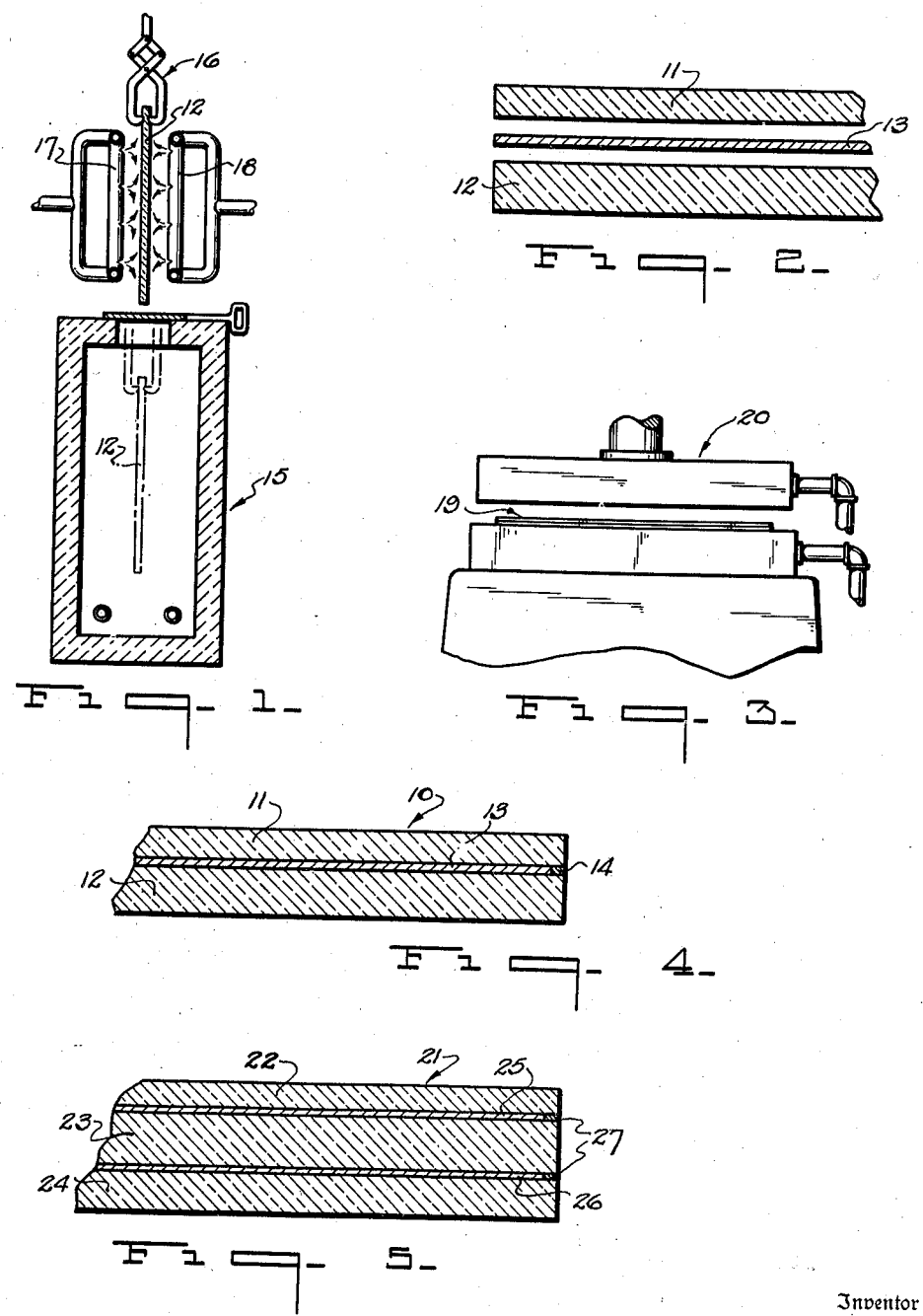
Inventor
WILLIAM E. NOBBE.
By Frank Fraser
Attorney Patented Sept. 28, 1937

2,094,183

UNITED STATES PATENT OFFICE 2,094,183

SAFETY GLASS

William E. Nobbe, Toledo, Ohio, assignor to Libbey-Owens-Ford Glass Company, Toledo, Ohio, a corporation of Ohio Application December 5, 1933, Serial No. 701,041

2 Claims. (Cl. 49—81)

The present invention relates to composite safety glass and to the process of producing the same.

Safety glass, as known today, usually comprises two sheets of ordinary plate or window glass between which is arranged a layer of suitable plastic material, such as a cellulose ester, which is bonded to the glass sheets. As is well known, if a single sheet of ordinary plate or window glass is broken by an impact, it will break and fly into fragments of varying sizes and if broken in the vicinity of a person is quite apt to cause injury to such person. Safety glass is designed to prevent the scattering or flying of the glass, and this is accomplished by bonding the glass sheets to the intermediate plastic layer, with the thought in mind that should the sheet become broken, the fragments will remain adherent to the plastic.

The effectiveness of the safety glass is dependent, among other things, upon the quality of bond between the various laminations. Properly made safety glass will ordinarily not release sizeable particles of glass. However, even though the glass sheets are bonded to the plastic material, when broken the glass sheets break into particles of varying sizes and shapes. When impacted sufficiently hard, some of the glass may be thrown from the plastic or an entire portion of the laminated structure may be separated from the balance of the sheet and hurled against the occupants of the vehicle in which the glass may be installed.

It is an important object of this invention to provide an entirely new type of composite safety glass which is more resistant to breakage than ordinary safety glass and which, even when broken, will afford a greater degree or measure of protection to those who may be in close proximity thereto.

Briefly stated, the composite safety glass provided in accordance with the present invention comprises one sheet of ordinary plate or window glass and one sheet of glass which has been tempered or case hardened in a manner to increase its mechanical strength and modify its breaking characteristics, the two sheets of glass being bonded together by a sheet or layer of plastic material interposed therebetween. The hardened or tempered sheet of glass is so treated that if and when broken, it will fracture into a relatively large number of very small pieces which will remain adherent to the central layer of plastic.

Other objects and advantages of the invention will become more apparent during the course of the following description when taken in connection with the accompanying drawing.

In the drawing, wherein like numerals are employed to designate like parts throughout the same, Fig. 1 is a diagrammatic view of one type of apparatus which may be employed for heating and tempering the glass, Fig. 2 is a fragmentary sectional view showing the treated laminations in proper superimposed relationship, Fig. 3 discloses diagrammatically a form of pressing means which can be used in the making of the composite structure, Fig. 4 is a fragmentary sectional view showing a sheet of finished safety glass made in accordance with the present invention, and Fig. 5 is a similar view of a sheet of so-called bullet-proof glass.

Referring now to the drawing and particularly with reference first to Fig. 4, there is illustrated a sheet of composite safety glass 10, including a sheet of ordinary plate or window glass 11 and a sheet of hardened or tempered glass 12 bonded together by a central sheet or layer of plastic material 13 to form a unitary structure. Prior to the assembling of the glass sheets, however, the inner surfaces thereof are adapted to be covered with a coating of some suitable bonding medium and various forms of adhesives, solvents, etc., can be used as the bonding material between the glass and plastic. Ordinarily, a cellulose ester is used as the non-brittle portion of the composite sheet, and such cellulose esters as pyroxylin plastic and cellulose acetate have been used satisfactorily.

In carrying the invention into practice, the sheet of glass 12 is first case hardened or tempered in a manner to increase its mechanical strength and modify its breaking characteristics. To accomplish this, the glass sheet is first heated to a substantially uniform temperature throughout its thickness, with the temperature approximating that at which the glass begins to soften, after which the sheet, while thus heated, is subjected to a sudden cooling or chilling action which serves to place the outer surfaces thereof under compression and its interior under tension. Glass sheets, thus hardened or tempered, are much more resistant to breakage than ordinary plate or window glass. Furthermore, when impacted sufficiently hard to cause actual breakage, the glass will shatter or disintegrate into a large number of very small particles or fragments, so that even if broken the chances of serious injury to persons nearby are greatly reduced.

The heating of the glass sheet 12 to a substantially uniform temperature throughout its thickness may be accomplished by placing the sheet in a heating chamber 15, with the sheet being suspended from near its upper edge by tongs 16. The chamber 15 may, of course, be of any approved type both as regards the means of heating it and the means for feeding the sheet thereto and removing it therefrom.

After the glass sheet 12 has been brought to the desired temperature, it is withdrawn vertically from the heating chamber 15 and subjected immediately to a sudden cooling or chilling action to temper the same. The tempering means here shown consists of the spaced vertically disposed cooling devices 17 and 18 respectively, positioned directly above the heating chamber and adapted to receive the glass sheet therebetween as it is drawn upwardly therefrom. These cooling devices are provided with a relatively large number of small openings, from which jets of air under pressure are adapted to be projected against the sheet. The jets of air impinging upon the opposite surfaces of the highly heated glass sheet naturally cause a quick or sudden cooling or chilling thereof and results in the outer surface skins of the said sheet being placed under compression and the interior thereof under tension.

After the sheet has been suitably tempered, it is arranged in properly assembled relationship with respect to the sheet of ordinary plate or window glass 11 and the layer of plastic material 13, the layer of plastic being interposed between the two sheets of glass. After the several laminations have been properly treated and assembled, the sandwich 19 thus produced, is adapted to be subjected to the action of heat and pressure to effect the uniting thereof. For this purpose, an ordinary platen press 20 of the type illustrated in Fig. 3 may be used, or, if desired, the sandwich can be preliminarily pressed by first passing it through a series of pairs of rollers and then finally pressed in an autoclave. The chilling of the glass can also be accomplished between cold metal surfaces or by plunging in a bath of liquid.

Although the novel and improved type of composite safety glass herein provided can be put to various uses, it has been primarily designed for the windshields and/or windows of automotive vehicles, and when so used it is preferable that the sheet of tempered or hardened glass be placed toward the inside of the vehicle. This is desirable, since in the event the hardened sheet of glass is broken, it will break into a large number of very small particles which will ordinarily remain adherent to the plastic. In other words, there is much less danger of these small particles being thrown from the plastic than is the case with ordinary plate or window glass. However, if for some reason or other, some particles of the glass should be released from the composite structure, they will not be of sufficient size or of such shape as to cause serious injury to persons riding in the vehicle. It has been found that when a glass sheet, tempered in the manner above described, is broken, it breaks into a large number of particles and that no particle of glass has a greater diameter than one-half inch, while the majority of the particles have a diameter less than one-quarter inch. Also, it seems characteristic of the glass that it breaks in such a way that the particles are retained in inter-locking relationship.

It has been demonstrated, by numerous tests, that flying pebbles or gravel have a tendency to fracture safety glass. When a safety glass windshield, for instance, is impacted with a fairly large object, the weight of the object is sufficient to cause a slight bending of the windshield and even though the glass cracks in the great majority of cases, no glass will leave the inner plastic. However, when light pebbles strike the windshield with bullet-like velocity, they do not possess sufficient weight to bend it and occasionally the inner sheet of glass is conchoidally fractured. That is to say, a small piece of glass will be released from within the thickness of the inner sheet of glass itself, and there is, of course, the possibility that this piece of glass may cause injury to the occupants of the vehicle. However, by using a composite safety glass windshield including a sheet of tempered glass, and in placing this sheet toward the inside of the vehicle, the composite sheet will not only be more resistant to such fractures, but even should it be thus fractured, the inner tempered sheet of glass will break into very small particles, and even though some of these particles may be released, they will not be of sufficient size to cause any serious injury. The same, of course, also holds true of the door and window lights.

It is also preferable, although not absolutely necessary, that the sheet of ordinary plate or window glass 11 be relatively thinner than the sheet of hardened or tempered glass 12. The reason for this difference in thickness is so that the over-all thickness of the finished composite sheet will be very little, if any, greater than the over-all thickness of the present safety glass sheet made of two sheets of ordinary plate or window glass and which thickness is approximately seven thirty-seconds to nine thirty-seconds of an inch. Up to the present time, it has been found impractical to satisfactorily temper extremely thin sheets of glass in the manner set forth above, and in fact the thinnest sheet which can be satisfactorily treated is three-sixteenths or six thirty-seconds of an inch. The use of two sheets of tempered glass would therefore result in a composite sheet at least twelve thirty-seconds of an inch, not including the inner sheet of plastic. The present invention, therefore, contemplates the use of a relatively thinner sheet of plate or window glass which, when combined with the sheet of tempered glass, will result in a composite sheet of approximately the same over-all thickness as ordinary safety glass made up of two sheets of plate or window glass. For instance, the sheet of tempered glass may be six thirty-seconds of an inch thick, and the sheet of ordinary plate or window glass one-eighth or four thirty-seconds of an inch, giving an over-all thickness of approximately ten thirty-seconds of an inch, which will be only one thirty-second of an inch thicker than the majority of safety glass made today. If desired, however, the sheet of plate or window glass can be slightly thinner than one-eighth of an inch so as to bring the over-all thickness of the composite sheet down to nine thirty-seconds of an inch or even slightly less. This would, of course, be preferable since the improved type of safety glass herein provided could then be readily substituted for ordinary safety glass now in use. While the composite safety glass here provided may be slightly more expensive to produce than ordinary safety glass, it will possess advantages which will more than outweigh the increased cost of production.

In Fig. 5 of the drawing, there is illustrated a sheet of so-called bullet-proof glass 21, made up of three sheets of glass 22, 23 and 24, bonded together by two layers of plastic material 25 and 26 to provide a unitary structure. The central sheet of glass 23 is of relatively greater thickness than the glass sheets 22 and 24 and is preferably of ordinary plate glass. The sheet 24, while relatively thicker than sheet 22, is likewise relatively thinner than sheet 23 and is preferably of hardened or tempered glass, while the sheet 22 may be of ordinary plate or window glass. If preferred, however, the inner sheet of glass 23 may also be tempered or hardened. When used as a shield, it is preferred that the sheet of hardened glass 24 be placed upon the inside.

In the claims, the term "sheet glass" is used in a generic sense to mean either plate glass which is ground and polished, or window glass which is not ground and polished.

I claim:

1. A composite safety glass sheet including a layer of plastic material faced on both sides with adherent plates of glass, one of said plates of glass only being case hardened to modify its breaking characteristics while the other plate is ordinary sheet glass.

2. A composite safety glass sheet including two plates of glass and an interposed layer of plastic material bonded thereto, one of said plates of glass only having its outer surfaces under compression and its interior under tension while the other plate is ordinary sheet glass.

WILLIAM E. NOBBE.